(12) United States Patent
Morikawa

(10) Patent No.: US 7,878,294 B2
(45) Date of Patent: Feb. 1, 2011

(54) VARIABLE GEAR RATIO STEERING APPARATUS

(75) Inventor: Kunihiko Morikawa, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 37 days.

(21) Appl. No.: 12/056,775

(22) Filed: Mar. 27, 2008

(65) Prior Publication Data

US 2008/0264714 A1 Oct. 30, 2008

(30) Foreign Application Priority Data

Apr. 26, 2007 (JP) ............................. 2007-117516

(51) Int. Cl.
*B62D 5/00* (2006.01)
*B62D 5/04* (2006.01)

(52) U.S. Cl. ...................................... 180/444; 180/204

(58) Field of Classification Search ................. 180/444, 180/204; 74/388 PS
See application file for complete search history.

(56) References Cited

U.S. PATENT DOCUMENTS

| | | | | |
|---|---|---|---|---|
| 3,552,517 | A * | 1/1971 | Nordeen | 180/421 |
| 4,751,976 | A * | 6/1988 | Higuchi et al. | 180/446 |
| 4,901,831 | A * | 2/1990 | Ito et al. | 192/38 |
| 5,336,137 | A * | 8/1994 | Kawakita | 475/347 |
| 5,450,916 | A * | 9/1995 | Budaker et al. | 180/444 |
| 5,835,870 | A | 11/1998 | Kagawa | |
| 6,198,992 | B1 * | 3/2001 | Winslow | 701/23 |
| 6,199,654 | B1 * | 3/2001 | Kojo et al. | 180/443 |
| 6,851,510 | B2 * | 2/2005 | Furumi et al. | 180/445 |
| 6,903,471 | B2 | 6/2005 | Arimitsu et al. | |
| 6,978,860 | B2 * | 12/2005 | Ozsoylu et al. | 180/444 |
| 7,306,535 | B2 * | 12/2007 | Menjak et al. | 475/29 |
| 7,448,464 | B2 * | 11/2008 | Yamasaki et al. | 180/402 |
| 2001/0054519 | A1 * | 12/2001 | Nishiwaki et al. | 180/167 |
| 2003/0127274 | A1 * | 7/2003 | Dominke et al. | 180/402 |
| 2005/0082107 | A1 * | 4/2005 | Husain et al. | 180/402 |
| 2005/0124451 | A1 * | 6/2005 | Morikawa | 475/6 |
| 2005/0155812 | A1 * | 7/2005 | Yamamori et al. | 180/444 |
| 2006/0247081 | A1 * | 11/2006 | Yamauchi et al. | 475/1 |
| 2007/0151795 | A1 * | 7/2007 | Chino et al. | 180/444 |

(Continued)

FOREIGN PATENT DOCUMENTS

CN          1515060 A          7/2004

(Continued)

*Primary Examiner*—Lesley Morris
*Assistant Examiner*—Wesley Potter
(74) *Attorney, Agent, or Firm*—Global IP Counselors, LLP

(57) ABSTRACT

A variable gear ratio steering apparatus has a steering operating member, a turning unit to turn a vehicle wheel and a gear ratio varying unit arranged between the steering operating member and the turning unit. The gear ratio varying unit comprises a differential gear mechanism, a gear ratio control motor and a steering torque assistance motor. The differential gear mechanism has a first internally toothed gear coupled to the steering operating member, a second internally toothed gear coupled to an input shaft of the turning unit and arranged coaxially with respect to the first internally toothed gear, at least one inside gear meshing with both the first and second internally toothed gears, and an inside gear support member rotatably supporting the inside gear. The gear ratio control motor is connected to the inside gear support part. The steering torque assistance motor is connected to the second internally toothed gear.

20 Claims, 10 Drawing Sheets

U.S. PATENT DOCUMENTS

2007/0205040 A1 * 9/2007 Miyasaka et al. .......... 180/444
2007/0288142 A1 * 12/2007 Maeda et al. ................ 701/41

FOREIGN PATENT DOCUMENTS

| | | |
|---|---|---|
| DE | 10 2004 057925 A1 | 6/2006 |
| DE | 10 2005 020498 A1 | 11/2006 |
| DE | 10 2005 277716 A1 | 12/2006 |
| DE | 10 2005 045291 A1 | 3/2007 |
| JP | 11286280 A * | 10/1999 |
| JP | 2005-162124 A | 6/2005 |
| JP | 2006-168624 A | 6/2006 |
| JP | 2006-168625 A | 6/2006 |
| KR | 2004040074 A * | 5/2004 |

* cited by examiner

VARIABLE GEAR RATIO STEERING APPARATUS

CROSS-REFERENCE TO RELATED APPLICATIONS

This application claims priority to Japanese Patent Application No. 2007-117516, filed on Apr. 26, 2007. The entire disclosure of Japanese Patent Application No. 2007-117516 is hereby incorporated herein by reference.

BACKGROUND OF THE INVENTION

1. Field of the Invention

The present invention generally relates to a vehicle steering apparatus for turning (steering) a wheel (normally the front wheels) of a vehicle with a turning unit that moves in response to a steering input applied to a steering wheel or other steering operating member by a driver. More specifically, the present invention relates to a variable gear ratio steering apparatus having a torque transfer ratio, i.e., a steering gear ratio, between the steering operating member and a rotary portion of the turning unit.

2. Background Information

One example of a variable gear ratio steering apparatus for a vehicle is disclosed in Japanese Laid-Open Patent Publication No. 2005-162124. In this publication, the variable gear ratio steering apparatus disclosed as having a gear ratio varying unit arranged between a steering operating member and a wheel turning unit such that the steering operating member and the wheel turning unit are coupled together through the gear ratio varying unit. The gear ratio varying unit serves to establish a torque transfer ratio between the rotation of the steering operating member side (input side) of the gear ratio varying unit and the rotation of the turning unit side (output side) of the gear ratio varying unit. The gear ratio varying unit is configured such that the torque transfer ratio, i.e., the steering gear ratio, can be changed in accordance with a traveling state (condition) of the vehicle. The gear ratio varying unit typically uses a reduction function to change the transfer ratio between an input rotation and an output rotation and, thus, a differential gear mechanism is the main component element. In the variable gear ratio steering apparatus mentioned above, a harmonic drive gear mechanism is used as the differential gear mechanism.

The vehicle steering apparatus is also typically provided with a mechanism for supplementing a steering torque that is transferred from the steering operating member to a wheel through the wheel turning unit such that the driver can experience a light and comfortable steering operation. Steering assistance devices for supplementing the steering torque have generally been hydraulic devices, but electric power steering systems employing an electric motor are becoming more and more popular.

The variable gear ratio steering apparatus presented in Japanese Laid-Open Patent Publication No. 2005-162124 employs an electric power steering system. The steering torque assistance motor of the variable gear ratio steering apparatus presented in Japanese Laid-Open Patent Publication No. 2005-162124 is arranged on the wheel turning unit, which is a rack and pinion type wheel turning unit. The steering torque assistance motor is arranged to apply a supplemental assistance torque to a steering rack of the wheel turning unit.

In view of the above, it will be apparent to those skilled in the art from this disclosure that there exists a need for an improved variable gear ratio steering apparatus. This invention addresses this need in the art as well as other needs, which will become apparent to those skilled in the art from this disclosure.

SUMMARY OF THE INVENTION

In the variable gear ratio steering apparatus of Japanese Laid-Open Patent Publication No. 2005-162124, the steering torque assistance motor is arranged on the wheel turning unit and is isolated from the gear ratio varying unit. This arrangement causes certain problems that will now be explained.

When the vehicle is being driven at very low speeds, such as when parking in a garage, or the wheels are being turned with the vehicle in a stopped state, the steering operation amount (amount by which a steering operating member (e.g., steering wheel) is turned) tends to be large and the steering operation troublesome. In order to obtain the desired turning angle of the wheels with a small steering operation, the gear ratio changing unit amplifies the steering operation amount directed toward the wheel turning unit by controlling the steering gear ratio.

In such a case, the steering torque imparted to the wheel turning unit decreases and the driver must apply a larger steering torque (steering input) in order to operate the steering operating member. Thus, in order to ensure a light and comfortable steering operation, the steering torque assistance motor needs to generate a larger supplemental torque. Thus, the steering torque assistance motor needs to be larger than a steering torque assistance motor used in a steering apparatus not provided with a gear ratio varying unit because it is required to generate a large supplemental torque as described above. A large steering torque assistance motor arranged on the wheel turning unit interferes with other components and can easily cause problems with respect to installation of the steering apparatus in a vehicle.

Some vehicles execute automated steering during such driving situations as parallel parking and parking in garages. When a variable gear ratio steering apparatus in accordance with Japanese Laid-Open Patent Publication No. 2005-162124 is used in such a vehicle, the steering torque assistance motor drives the turning unit in order to accomplish the automated steering. Since the gear ratio varying unit is rotated during the automated steering even though it is not performing any necessary function, the steering torque assistance motor needs to generate an even larger torque in order to rotate the gear ratio varying unit in addition to turning the wheels of the vehicle. This empty rotation of the gear ratio varying unit makes it still more difficult to avoid using a larger steering torque assistance motor.

Furthermore, in the variable gear ratio steering apparatus of Japanese Laid-Open Patent Publication No. 2005-162124, the gear ratio varying unit uses a harmonic drive gear mechanism as a differential gear mechanism for enabling the torque transfer ratio between the input and output sides of the gear ratio varying unit to be changed. Consequently, the transfer efficiency is poor and the cost is higher in comparison with a planetary type differential gear mechanism.

One object of the present invention is to provide a variable gear ratio steering apparatus for a vehicle that avoids the problems described above. To accomplishes this object, a variable gear ratio steering apparatus is provided that abandons a configuration in which the steering torque assistance motor is arranged on the wheel turning unit and adopts a configuration in which the wheel turning unit does not carry any portion of the steering assistance system whatsoever. In this way, the wheel turning unit can be made more compact and a high degree of freedom can be obtained with respect to the arrangement of the wheel turning unit. Meanwhile, the steering torque assistance motor is arranged on the center axis of the steering column along with the gear ratio changing unit and the gear ratio changing unit is provided with an electric power steering system.

In view of the above, a variable gear ratio steering apparatus is provided that basically comprises a steering operating member, a turning unit to turn a vehicle wheel and a gear ratio varying unit arranged between the steering operating member and the turning unit. The gear ratio varying unit comprises a differential gear mechanism, a gear ratio control motor and a steering torque assistance motor. The differential gear mechanism includes a first outside internally toothed gear that is coupled to the steering operating member, a second outside internally toothed gear that is coupled to an input shaft of the turning unit and arranged coaxially with respect to the first outside internally toothed gear, at least one common inside gear meshing with both the first outside internally toothed gear and the second outside internally toothed gear, and an inside gear support member rotatably supporting the inside gear. The gear ratio control motor is operatively coupled to the inside gear support part. The steering torque assistance motor is operatively coupled to the second outside internally toothed gear.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
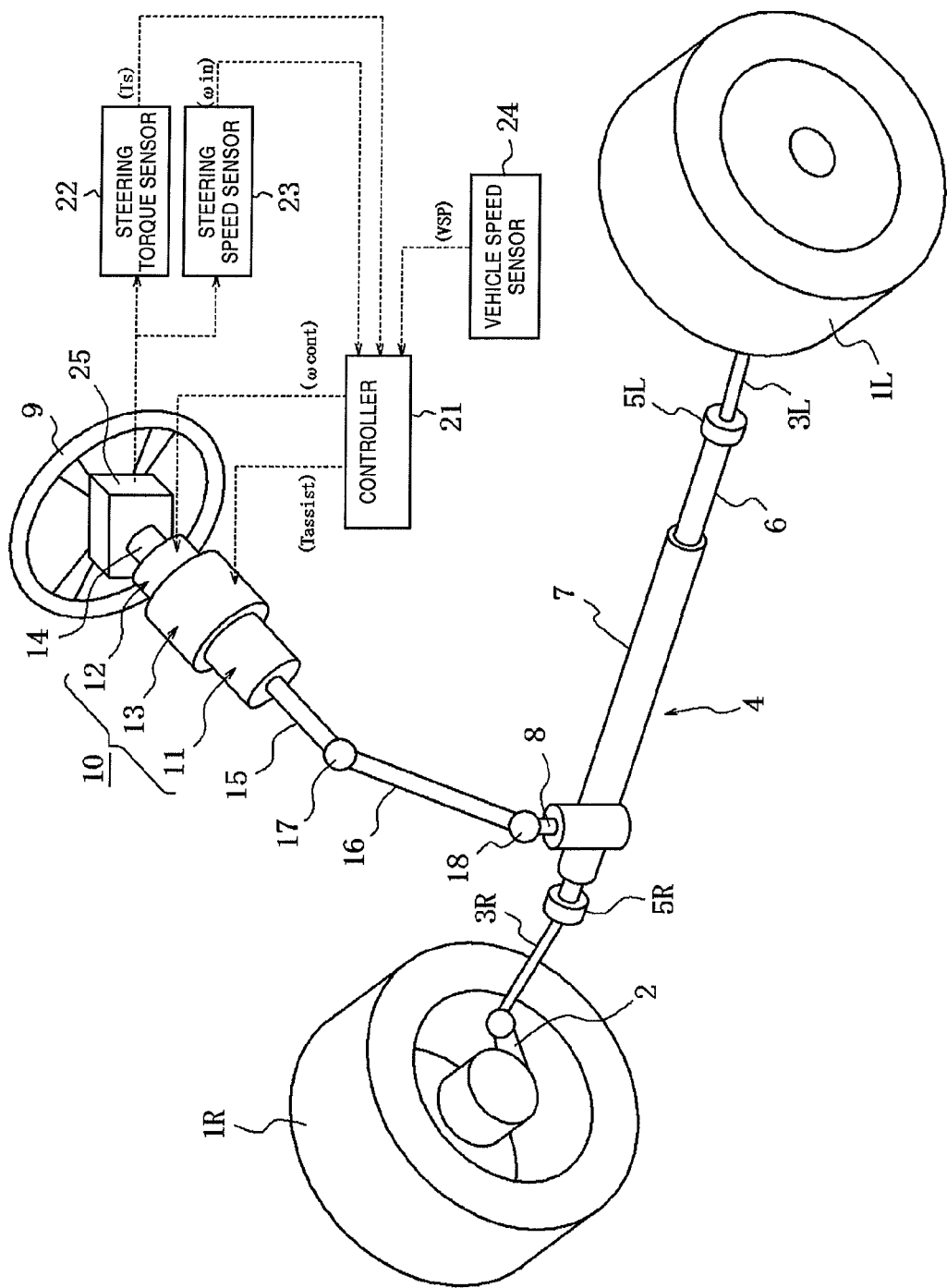
FIG. 1 is a diagrammatic perspective view of a vehicle variable gear ratio steering apparatus with a control system in accordance with a first embodiment.

FIG. 1 shows a vehicle variable gear ratio steering apparatus in accordance with an embodiment of the present invention. The variable gear ratio steering apparatus turns a left steered wheel (left front wheel) 1L and a right steered wheel (right front wheel) 1R. Each of the wheels 1L and 1R is connected to a knuckle arm 2 (only the knuckle arm of the right wheel 1R is visible in FIG. 1). Each of the knuckle arms 2 is connected to a side rod 3L or 3R of the respective wheel 1L or 1R. Each of the side rods 3L and 3R is connected to a wheel turning unit 4.

The wheel turning unit 4 has a rack shaft 6 that connects to the left and right side rods 3L and 3R through joints 5L and 5R. The rack shaft 6 is arranged in a housing 7 that is fixed to a body of the vehicle in which the variable gear ratio steering apparatus is installed. The rack shaft 6 is arranged and configured such that it can slide freely inside the housing 7 and meshes with a pinion (only a pinion shaft 8 thereof is visible in FIG. 1) that is housed in the housing 7 such that it can rotate freely. In short, the wheel turning unit 4 is a rack and pinion type wheel turning unit. The rack and pinion wheel turning unit 4 is configured such that when a steering torque is imparted to the pinion shaft 8 such that the pinion rotates, the rack shaft 6 (which meshes with the pinion) is moved in a stroke-like fashion leftward or rightward in the transverse direction of the vehicle. The movement of the rack shaft 6 is transmitted to the wheels 1L and 1R through the side rods 3L and 3R. Thus, the wheels 1L and 1R are turned in a direction corresponding to the direction in which the pinion shaft 8 was rotated. The wheel turning unit 4 does not hold any portion of a steering assistance system (power steering unit) whatsoever.

As shown in FIG. 1, a steering wheel 9 is provided as a steering operating member. A steering input generated when a driver turns the steering wheel 9 is transmitted to the pinion shaft 8 (input shaft of the turning unit 4) through a steering torque transmission train that will now be explained.

A gear ratio varying unit 10 is arranged on the center axis the steering column (i.e., the rotational axis of the steering wheel 9) and comprises a differential gear mechanism housing section 11, a gear ratio control motor housing section 12, and a steering torque assistance motor housing section 13.

The differential gear mechanism housing section 11 encloses a differential gear mechanism (described later) that is configured to connect an input shaft 14 and an output shaft 15 of the gear ratio varying unit 10 together such that a torque transfer ratio between the two shafts 14 and 15 can be changed. The gear ratio control motor housing section 12 encloses a gear ratio control motor (described later) for controlling the torque transfer ratio between the input shaft 14 and the output shaft 15. The steering torque assistance motor housing section 13 encloses a steering torque assistance motor (described later) for supplementing a steering torque transmitted from the input shaft 14 to the output shafted 15.

The input shaft 14 of the gear ratio varying unit 10 is connected to the steering wheel 9, and the output shaft 15 of the gear ratio varying unit 10 is connected to the pinion shaft 8 through an intermediate shaft 16. The connection between the intermediate shaft 16 and the output shaft 15 is accomplished with a universal joint 17, and the connection between the intermediate shaft 16 and the pinion shaft 8 is accomplished with a universal joint 18.

The structure of the gear ratio varying unit 10 will now be explained in detail based on FIG. 2. The gear ratio varying unit 10 is provided with a housing 31 with the differential gear mechanism housing section 11, the gear ratio control motor housing section 12, and the steering torque assistance motor housing section 13 being set end to end in the housing 31 in the order shown in FIG. 2. The differential gear mechanism housing section 11 is located at the left end in FIG. 2 and houses a planetary type differential gear mechanism 32. As shown in FIG. 3, the differential gear mechanism 32 comprises a first ring gear 33, a second ring gear 34, a pair of common pinions 35, and one common carrier 36. The first ring gear 33 constitutes a first outside internally toothed gear. The second ring gear 34 constitutes a second outside internally toothed gear. The second ring gear 34 is arranged coaxially with respect to the first ring gear 33. The common pinions 35 constitutes inside gears. The common pinions 35 are mesh with both ring gears 33 and 34. The common carrier 36 constitutes an inside gear support member that rotatably supports both of the pinions 35 on separate pinion shafts 35a. The tooth count Z1 of the ring gear 33 is set to be larger than the tooth count Z2 of the second ring gear 34 by the number kp corresponding to the number of the pinions 35. In the illustrated embodiment, the differential gear mechanism 32 has two of the pinions 35 such that the number kp is equal to two in the example shown in figures. Thus, the tooth counts have the following relationship: Z1−Z2=kp. The reasons for this relationship are to facilitate the ease of assembling the differential gear mechanism 32 and to obtain a desired operational effect that will be described later.

The input shaft 14 is connected to the first ring gear 33. The input shaft 14 passes through the center of the differential gear mechanism 32, the center of the steering torque assistance motor housing section 13 located the middle in FIG. 2, and the center of the gear ratio control motor housing section 12 located on the right end in FIG. 2. The input shaft 14 protrudes from the right-hand end of the housing 31 and the protruding end thereof connects to the steering wheel 9.

The output shaft 15 is connected to the second ring gear 34. The output shaft 15 extends in the opposite direction as the input shaft 14 such that it protrudes from the left-hand end of the housing 31. As shown in FIG. 1, the protruding end of the output shaft 15 connects to an intermediate shaft 16 which, in turn, connects to the pinion shaft 8 of the turning unit 4.

A gear ratio control motor 37 is housed inside the gear ratio control motor housing section 12 (located at the right-hand end in FIG. 2) for controlling the torque transfer ratio between the input shaft 14 and the output shaft 15. The gear ratio control motor 37 includes a stator 37s and a rotor 37r. The stator 37s is fixed inside the gear ratio control motor housing section 12 of the housing 31. The rotor 37r is arranged inside the stator 37s. The rotor 37r is connected to the carrier 36 with a hollow shaft 38 that encloses a portion of the input shaft 14.

A steering torque assistance motor 39 is housed inside the steering torque assistance motor housing section 13 (located in the middle of FIG. 2) for supplementing a steering torque transmitted to the output shaft 15. The steering torque assistance motor 39 includes a stator 39s and a rotor 39r. The stator 39s is fixed inside the steering torque assistance motor housing section 13 of the housing 31. The rotor 39r is arranged inside the stator 39s. The rotor 39r is connected to the ring gear 34 through a reduction gear 40. The reduction gear 40 is a simple planetary gear set that includes a ring gear 40r, a sun gear 40s, a pinion 40p and a carrier 40c. The ring gear 40r is fixed inside the housing 31. The sun gear 40s is arranged concentrically with respect to the ring gear 40r. The pinion 40p is arranged and configured to mesh with the ring gear 40r and the sun gear 40s. The carrier 40c is arranged and configured to rotatably support the pinion 40p. The sun gear 40s is connected to the rotor 39r by a hollow shaft 41. The hollow shaft 41 encloses a portion of the hollow shaft 38. The carrier 40c is connected to the second ring gear 34 (output shaft 15).

The operation of the variable gear ratio steering apparatus described above with reference to FIGS. 1 to 3 will now be explained.

The steering input applied to the steering wheel 9 is transferred to the input shaft 14 and passes through the first ring gear 33, the pinion 35, and the second ring gear 34 before reaching the output shaft 15. The steering torque transmitted to the output shaft 15 passes through the intermediate shaft 16 and reaches the pinion shaft 8. The pinion shaft 8 rotates a pinion (not shown) in a direction corresponding to the direction in which the steering wheel 9 was rotated and the rack shaft 6 strokes in the corresponding left or right direction so as to turn the wheels 1L and 1R.

During the turning, the torque transfer ratio (steering gear ratio) between the input shaft 14 and the output shaft 15 can be changed by driving the gear ratio control motor 37 such that rotor 37r thereof rotates the carrier 36 of the differential gear mechanism 32 in the opposite direction of the steering direction (i.e., opposite the rotation direction of the input shaft 14). The torque transfer ratio (steering gear ratio) between the input shaft 14 and the output shaft 15 can be controlled by increasing and decreasing the rotational speed at which the rotor 37r rotates the carrier 36 in said direction.

The principles behind this gear ratio control will now be explained.

Figure 2:
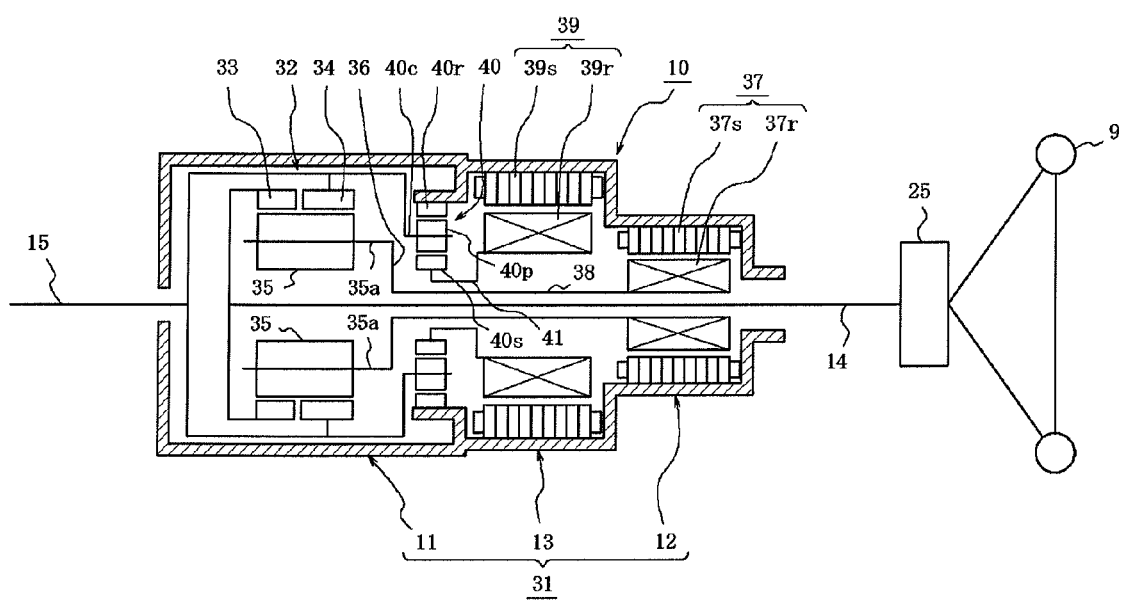
FIG. 2 is a diagrammatic cross sectional view of a gear ratio varying unit of the vehicle variable gear ratio steering apparatus shown in FIG. 1.
Figure 3:
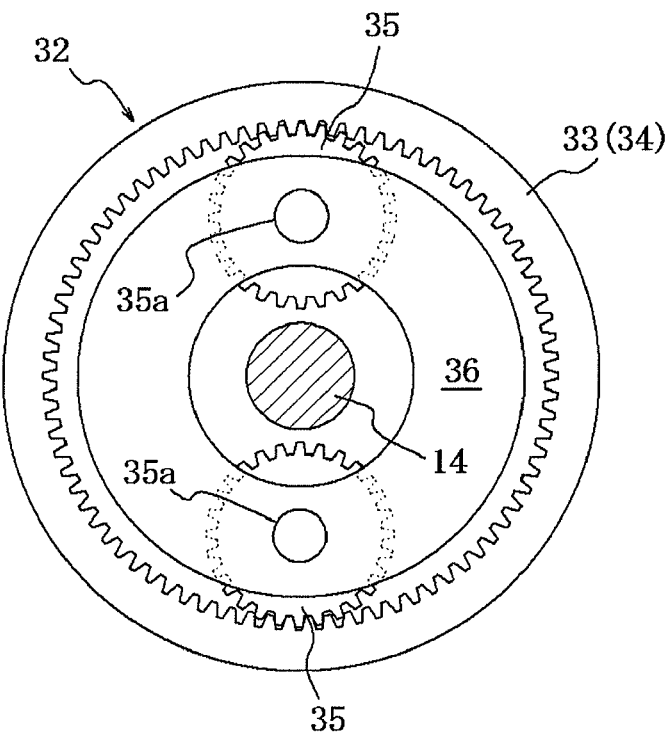
FIG. 3 is a front view of a differential gear mechanism of the gear ratio varying unit shown in FIG. 2 as viewed along an axial direction.
Figure 4:
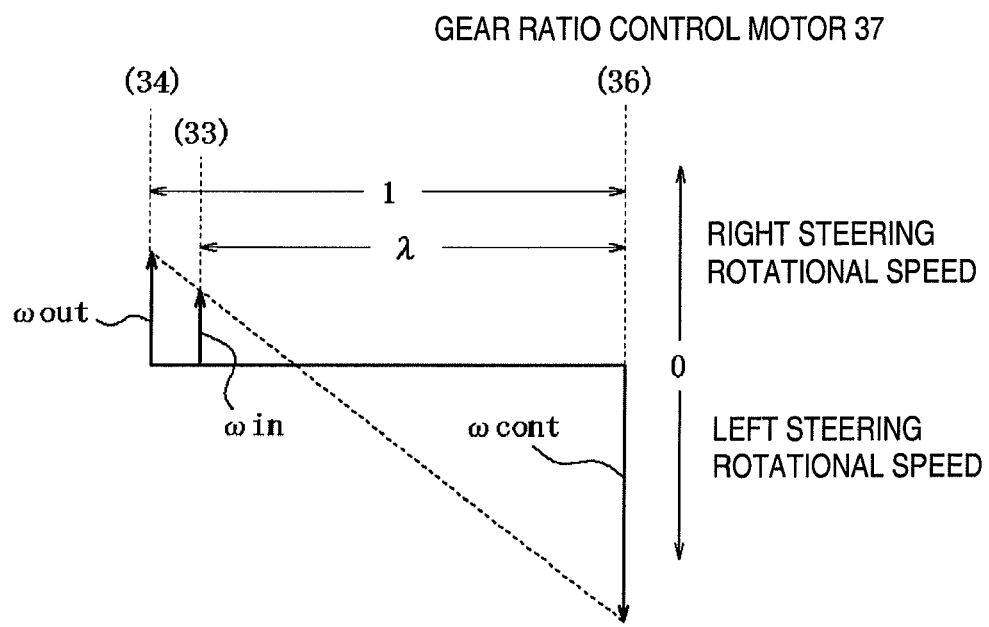
FIG. 4 is a lever analogy diagram of the differential gear mechanism illustrated in FIG. 3.

FIG. 4 is a lever analogy diagram of the differential gear mechanism 32 shown in FIGS. 2 and 3. The rotational speed order of the rotary members (first ring gear 33, second ring gear 34, and carrier 36) that make up the differential gear mechanism 32 is as follows (as shown in FIG. 4): second ring gear 34, first ring gear 33, and carrier 36. The vertical axis of FIG. 4 indicates the rotational speeds of the rotary members (first ring gear 33, second ring gear 34, and carrier 36) that make up the differential gear mechanism 32, and the horizontal axis indicates a ratio $\lambda$ of distances between the rotary members (first ring gear 33, second ring gear 34, and carrier 36) that make up the differential gear mechanism 32. The ratio is determined by the tooth count Z1 of the first ring gear 33 and the tooth count Z2 of the second ring gear 34. More specifically, the ratio $\lambda$ is the ratio of the distance between the carrier 36 and the first ring gear 33 with respect to the distance between the carrier 36 and the second ring gear 34.

The distance ratio $\lambda$ is expressed with the following equation: $\lambda=Z2/Z1$. Meanwhile, the equation $Z1-Z2=kp$ (number of pinions 35) also holds.

If the rotational speed (steering speed) imparted to the first ring gear 33 from the steering wheel 9 (input shaft 14) is $\omega in$, the gear ratio control rotational speed imparted to the carrier 36 from the gear ratio control motor 37 is $\omega cont$, and the output rotational speed imparted to the output shaft 15 from the second ring gear 34 is $\omega out$, then the following equation can be written: $(1-\lambda)\omega cont=\omega in-\lambda\omega out$. The relationship expressed in this equation appears as shown in FIG. 4 when depicted as a lever analogy diagram.

Thus, the torque transfer ratio (steering gear ratio) between the input shaft 14 and the output shaft 15 can be changed by driving the gear ratio control motor 37 such that rotor 37r thereof rotates the carrier 36 of the differential gear mechanism 32 in the opposite direction of the steering direction (i.e., opposite the rotation direction of the input shaft 14). More specifically, when the rotational speed imparted to the carrier 36 by the rotor 37r in said opposite direction is increased, the torque transfer ratio (steering gear ratio) between the input shaft 14 and the output shaft 15 is controlled in such a direction that the output rotational speed ωout imparted to the output shaft 15 increases. Conversely, when the rotational speed imparted to the carrier 36 by the rotor 37r in said opposite direction is decreased, the torque transfer ratio (steering gear ratio) between the input shaft 14 and the output shaft 15 is controlled in such a direction that the output rotational speed ωout imparted to the output shaft 15 decreases.

During the steering operation, the steering torque imparted from the output shaft 15 to the steering mechanism 4 (more specifically, the pinion shaft 8) can be supplemented and light and comfortable operation of the steering wheel 9 can be ensured by driving the steering torque assistance motor 39 in the same direction as the rotation direction of the input shaft 14 (i.e., in the steering direction) such that the rotor 39r of the steering torque assistance motor 39 imparts a torque to the output shaft 15 through the reduction gear 40.

The steering gear ratio control of the gear ratio control motor 37 and the steering torque control of the steering torque assistance motor 39 described above are executed by a controller 21 shown in FIG. 1.

The controller 21 receives a signal from a steering torque sensor 22 that detects a steering torque Ts of the steering wheel 9, a signal from a steering speed sensor 23 that detects the steering speed (steering input rotational speed) ωin of the steering wheel 9, and a signal from a vehicle speed sensor 24 that detects a vehicle speed VSP.

The steering torque sensor 22 and the steering speed sensor 23 are actually installed as a steering input sensor group 25 arranged in the joint section between the steering wheel 9 and the input shaft 14, as shown in FIGS. 1 and 2.

The controller 21 is configured to use the input signals and a known computational method to calculate a target steering gear and a target steering torque corresponding to the traveling state of the vehicle. The controller 21 then calculates a target gear ratio motor rotational speed ωcont for achieving the target steering gear and a target assistance torque Tassist for achieving the target steering torque. The controller 21 sends the target gear ratio motor rotational speed ωcont as a command to the gear ratio control motor 37 housed inside the housing section 12 and sends the target assistance torque Tassist as a command to the steering torque assistance motor 39 housed inside the housing section 13.

The steering gear ratio control is configured such that when the vehicle speed VSP is low, the steering gear ratio is determined such that a larger steered wheel angle (turning angle) is obtained with respect to a given steering wheel operation amount in order to increase the steering performance. Conversely, when the vehicle speed VSP is high, the steering gear ratio is determined such that a smaller steered wheel angle is obtained with respect to a given steering wheel operation amount in order to increase the stability of the vehicle. The steering torque control is configured to increase the steering torque assistance so as to enable a light and comfortable steering operation when the vehicle is traveling a low speeds and to decrease the steering torque assistance so as to obtain traveling stability when the vehicle is traveling at higher speeds.

In situations where automatic steering is required, such as when parallel parking and parking in garages, the automatic steering of the wheels 1L and 1R can be accomplished by driving the output shaft 15 with the steering torque assistance motor 39 such that motor torque is transferred from the output shaft 15 to the turning unit 4.

As described previously, a variable gear ratio steering apparatus in accordance with the first embodiment has the gear ratio varying unit 10 that is arranged between the steering wheel 9 and the wheel turning unit 4 and serves to change the steering gear. The gear ratio varying unit 10 has the planetary type differential gear mechanism 32, the gear ratio control motor 37, and the steering torque assistance motor 39 as discussed above. The differential gear mechanism 32 includes the first ring gear 33 connected to the steering wheel 9, the second ring gear 34 that is arranged coaxially with respect to the first ring gear 33 and connected to the input shaft 8 of the wheel turning unit 4, the common pinions 35 arranged and configured to mesh with both ring gears 33 and 34, and the common carrier 36 arranged and configured to rotatably support both pinions 35. The gear ratio control motor 37 is coupled to the carrier 36 such that it can change the steering gear ratio. The steering torque assistance motor 39 is coupled to the second ring gear 34 such that it can supplement a steering torque oriented from the second ring gear 34 toward the input shaft 8 of the wheel turning unit 4. Thus, the steering torque assistance motor 39 is isolated from the wheel turning unit 4 and built into the gear ratio changing unit 10 such that it is arranged on the center axis of the steering column as shown in FIG. 1. As a result, the operational effects that will now be explained are obtained.

Since the wheel turning unit 4 does not hold the steering assistance system at all, the turning unit can be made more compact and can be arranged with a high degree of freedom. Even if a large steering torque assistance motor is required for the reasons described above (e.g., in order to use a steering gear ratio with which a given steering wheel operation amount results in a large steered wheel angle, such as during low speed driving), the problem of the steering torque assistance motor 39 interfering with other peripheral component parts of the turning unit 4 and making installation of the steering torque assistance motor 9 into the vehicle difficult can be avoided.

In a variable gear ratio steering apparatus in accordance with this embodiment, the differential gear mechanism that enables the torque transfer ratio (steering gear ratio) between the input shaft 14 and output shaft 15 of the gear ratio varying unit 10 to be changed is configured as a planetary gear set as described above. As a result, when automated steering is executed in such driving situations as parallel parking and parking in garages by controlling the steering torque assistance motor 39 so as to drive the turning unit 4, the degree to which the gear ratio varying unit 10 must be rotated can be held to a minimum such that the load imposed on the steering torque assistance motor 39 can be reduced, thus enabling the size of the steering torque assistance motor 39 to be curbed.

In a variable gear ratio steering apparatus in accordance with this embodiment, the differential gear mechanism that enables the torque transfer ratio (steering gear ratio) between the input shaft 14 and the output shaft 15 of the gear ratio varying unit 10 to be changed is configured as a planetary gear set as described above. As a result, the torque transmission efficiency is improved in comparison with when a harmonic drive gear mechanism is used as the differential gear mechanism. Furthermore, with a differential gear mechanism in accordance with the present invention, a variable gear ratio steering apparatus that is more compact and less expensive can be obtained.

Since the steering torque assistance motor 39 is connected to the second ring gear 34 through a reduction gear 40, the torque transferred from the steering torque assistance motor 39 to the second ring gear 34 (wheel turning unit 4) can be amplified and the torque output required from the steering torque assistance motor 39 can be reduced. As a result, the size of the motor 39 can be reduced and the size of the gear ratio varying unit 10 can be reduced. Additionally, since the tooth count Z1 of the first ring gear 33 is larger than the tooth count Z2 of the second ring gear 34 by the number kp of pinions 35 (two in the embodiment), the differential gear mechanism 32 can be assembled more easily and the steering gear ratio control effect described above can be obtained.

Figure 5:
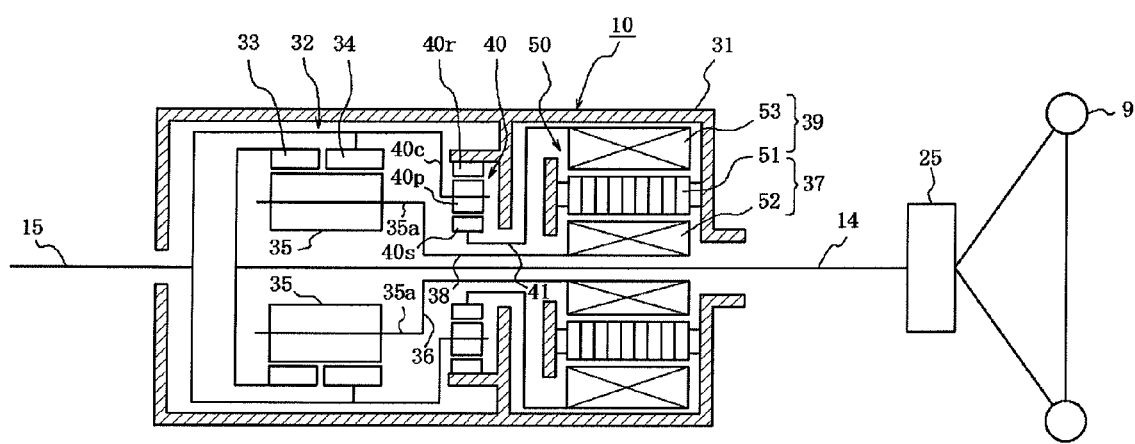
FIG. 5 is a diagrammatic cross sectional view, similar to FIG. 2, of a gear ratio varying unit in accordance with another embodiment.

FIG. 5 shows another embodiment in which the gear ratio control motor 37 and the steering torque assistance motor 39 are provided in the form of a composite current multiple layer motor 50. Otherwise, the constituent features of the variable gear ratio steering apparatus are the same as the previous embodiment.

The composite current multiple layer motor 50 includes an annular stator 51, an inner rotor 52 and an outer rotor 53. The annular stator 51 is fixed to the inside of the housing 31. The inner rotor 52 is arranged concentrically on the inside of the stator 51. The outer rotor 53 is arranged concentrically on the outside of the stator 51. The stator 51 and the inner rotor 52 constitute the gear ratio control motor 37. The stator 51 and outer rotor 53 constitute the steering torque assistance motor 39. The inner rotor 52 (i.e., the rotor of the gear ratio control motor 37) is connected to the carrier 36 with a hollow shaft 38, and the outer rotor 53 (i.e., the rotor of the steering torque assistance motor 39) is connected to the second ring gear 34 with the hollow shaft 41 and the reduction gear 40.

This embodiment provides the same operational effects as the previous embodiment. Additionally, since the gear ratio control motor 37 and the steering torque assistance motor 39 are provided in the form of a composite current multiple layer motor 50, the gear ratio control motor 37 and the steering torque assistance motor 39 are combined into a single unit. As a result, the storage space required for the motors 37 and 39 can be reduced and the size of the gear ratio varying unit 10 can be reduced. Thus, the operational effects of the previous embodiment are obtained to an even greater degree.

Figure 6:
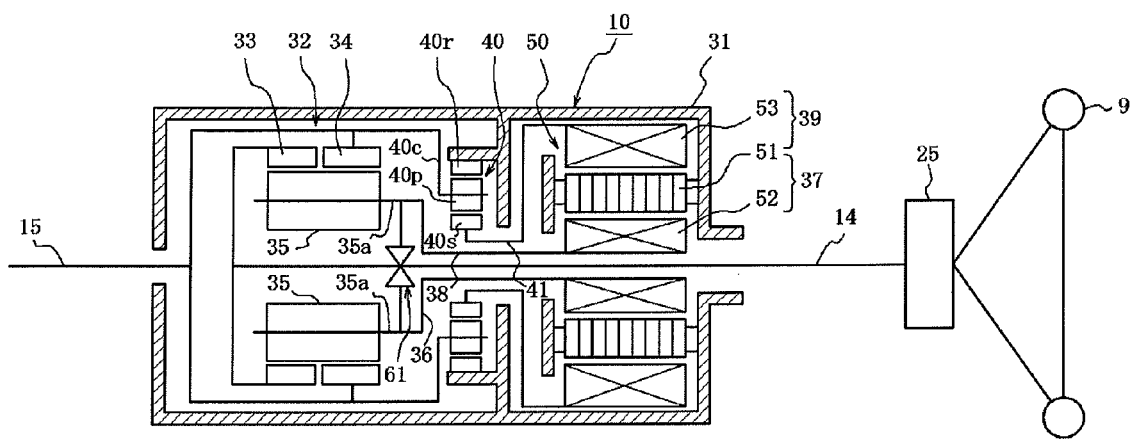
FIG. 6 is a diagrammatic cross sectional view, similar to FIGS. 2 and 5, of a gear ratio varying unit in accordance with still another embodiment.

FIG. 6 shows still another embodiment. This embodiment is the same as the embodiment shown in FIG. 5, except that a two-way clutch 61 has been added.

The two-way clutch 61 is configured to connect and disconnect in a two-way manner between the carrier 36 and the input shaft 14 of the gear ratio varying unit 10. Thus, the two-way clutch 61 serves to establish the connection between the steering wheel 9 and the first ring gear 33. When the two-way clutch 61 is connected, the differential gear mechanism 32 is put into an interlocked state in which the all of the component parts rotate together as a single unit in both directions. The two-way clutch 61 is connected and disconnected as required. The two-way clutch 61 will now be explained with reference to FIG. 7.

Figure 7:
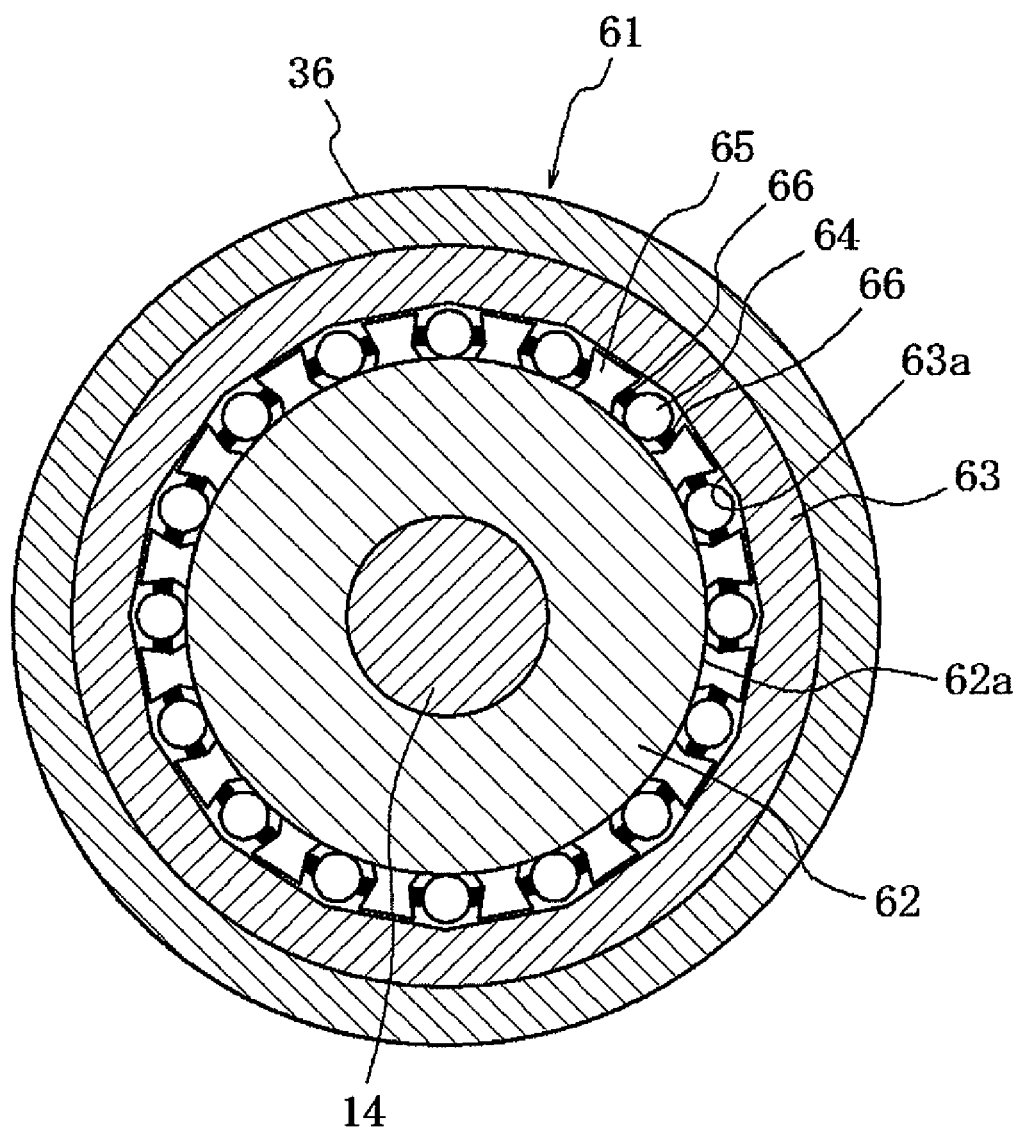
FIG. 7 is a frontal cross sectional view of a two-way clutch used in the embodiment shown in FIG. 6.

As illustrated in FIG. 7, the two-way clutch 61 has an inner race 62 and an outer race 63. The inner race 62 is attached onto the input shaft 14 such that it can rotate integrally with the input shaft 14. The outer race 63 is attached to the internal circumference of the carrier 36 such that it can rotate integrally with the carrier 36. An external circumferential surface 62*a* of the inner race 62 is a smooth cylindrical surface, and an internal circumferential surface 63*a* of the outer race 63 is a cam surface having a regular polygonal shape. Cam rollers 64 are arranged between the surfaces 62*a* and 63*a*. The number of cam rollers 64 is the same as the number of apex angles of the regular polygonal cam surface 63*a* of the outer race 63. The cam rollers 64 are held with a holder 65 so as to have equal spacing there-between in the circumferential direction, and the holder 65 is pressed (spring loaded) in a radially inward direction with an elastic ring 66 such that it contacts the external circumferential surface of the inner race 62.

The two-way clutch 61 also has an electromagnet configured to attract the holder 65 in a radially outward direction in opposition to the radially inward force applied to the holder 65 by the elastic ring 66 such that the holder 65 is drawn into contact with the regular polygonal cam surface 63*a* of the outer race 63. When the ignition switch has been turned on and the engine is running, the electromagnet is turned on so long as the steering apparatus is in a non-failed state in which it can function properly. In this state, the holder 65 is drawn against the regular polygonal cam surface 63*a* of the outer race 63 and separated from the external surface of the inner race 62, thereby releasing the two-way clutch 61.

When the two-way clutch 61 is in the released state, the cam rollers 64 are positioned in the apex angles (corners) of the regular polygonal cam surface 63*a* of the outer race 63 such that the input shaft 14 and the carrier 36 can rotate relative to each other in both directions without the holder 65 being rotated due to contact with the external circumferential surface of the inner race 62. In other words, when the ignition switch has been turned on, the engine is running, and the steering apparatus is in a non-failed state in which it can function properly, the differential gear mechanism 32 is not in the interlocked state and the variable gear ratio steering apparatus can be operated as described previously.

Conversely, if the ignition switch is off and the engine is not running or if the engine is running but the steering apparatus is in a failed state in which it cannot function properly, then the electromagnet of the two-way clutch 61 is turned off or a control is executed to turn the electromagnet off. When this occurs, the holder 65 can no longer be drawn against (pulled into contact with) the regular polygonal cam surface 63*a* of the outer race 63 and the radially inward force applied by the elastic ring 66 causes the holder 65 to be pressed against the external circumferential surface of the inner race 62. The torque (steering input) of the input shaft 14 causes the holder 65 to rotate and, thus, causes the cam rollers 64 to rotate. Consequently, the cam rollers 64 move from the apex angles of the regular polygonal cam surface 63*a* of the outer race 63 and become pinched between the flat cam surfaces 63*a* located between the apex positions and the external circumferential surface of the inner race 62. In this way, the two-way clutch 61 becomes connected in both directions, i.e., it can transfer torque in either of the two rotational directions.

When the two-way clutch 61 is connected, the differential gear mechanism 32 is put into an interlocked state in which the all of the component parts rotate together as a single unit in both directions. Thus, a torque (steering input) imparted to the input shaft 14 is transferred to the output shaft 15 through the interlocked differential gear mechanism 32 with a fixed gear ratio (1:1). As a result, when the ignition switch is off and the engine is not running or when the engine is running but the steering apparatus is in a failed state in which it cannot function properly, the steering apparatus can function as a manual steering apparatus without a variable gear ratio control. However, even if the variable steering gear ratio control is not functioning, the steering torque assistance motor 39 can be used to provide a steering assistance torque so long as the control system for the steering torque assistance motor 39 is functioning normally.

Figure 8:
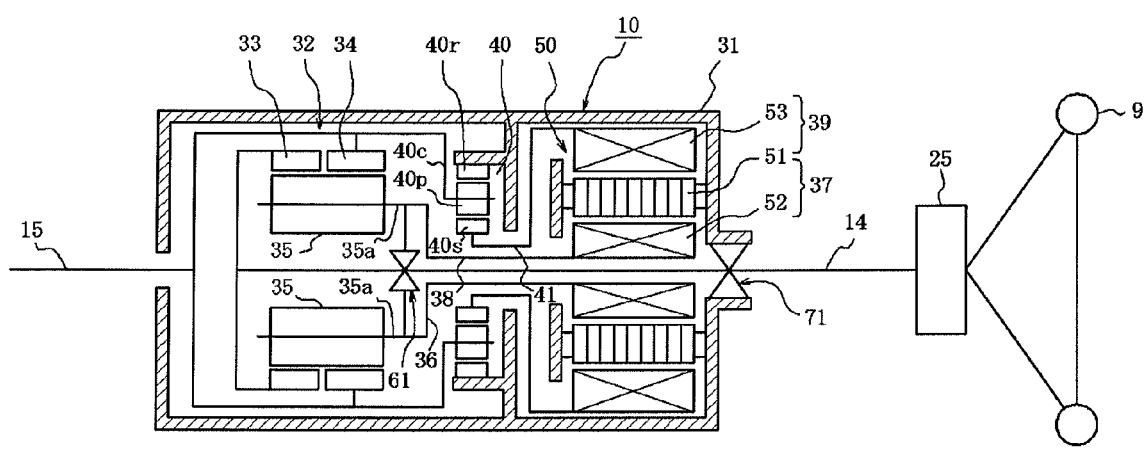
FIG. 8 is a diagrammatic cross sectional view, similar to FIGS. 2, 5, and 6, of a gear ratio varying unit in accordance with still another embodiment of the present invention.

FIG. 8 shows still another embodiment. This embodiment is the same as the embodiment shown in FIG. 6, except that a two-way brake 71 has been added. The two-way brake 71 is configured and arranged to hold the input shaft 14 of the gear ratio varying unit 10 to the housing 31 such that the input shaft 14 cannot rotate in either direction. Thus, the two-way brake 71 serves to establish the connection between the steering wheel 9 and the first ring gear 33. The two-way brake 71 is connected during automated steering. The constituent features of the two-way brake 71 are illustrated in FIG. 9.

Figure 9:
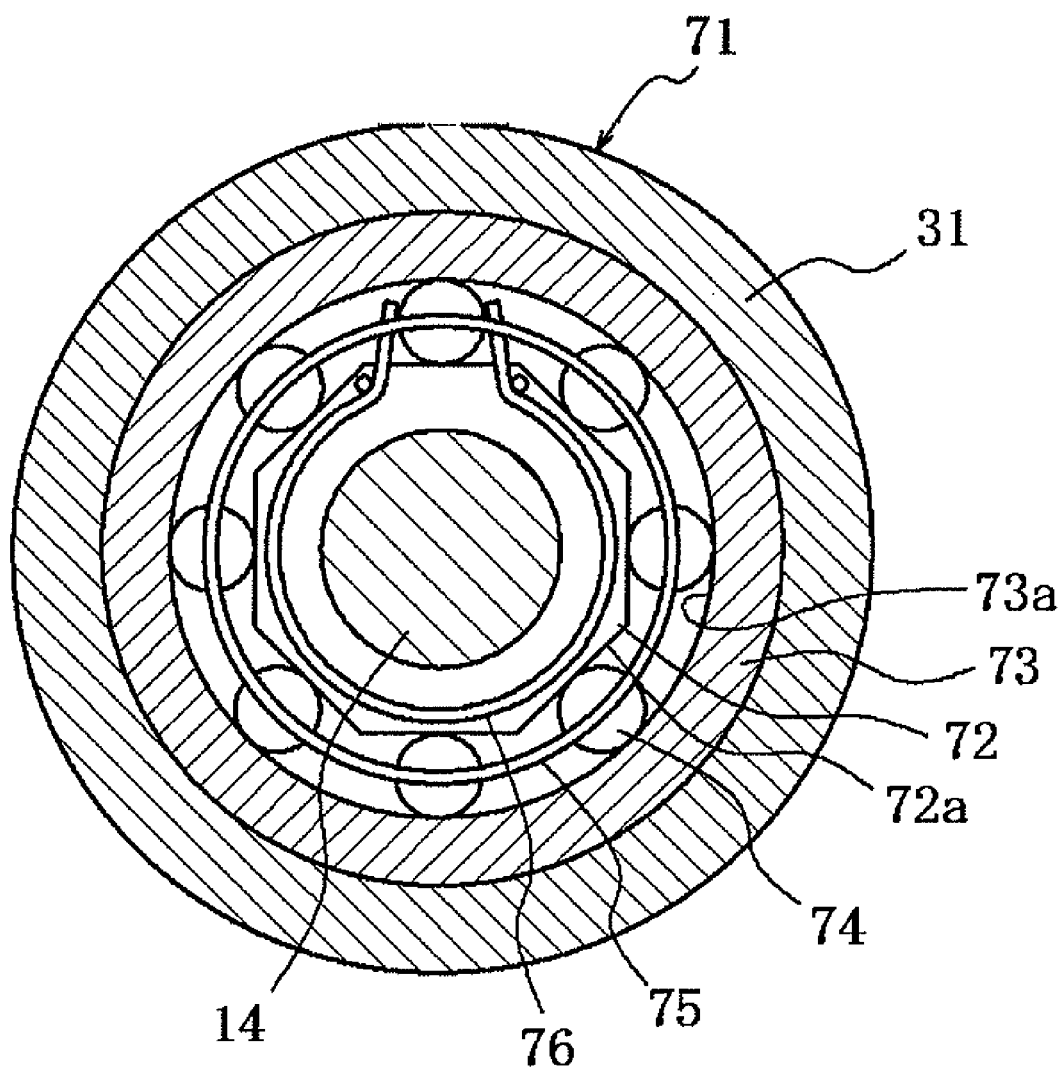
FIG. 9 is a front cross sectional view of a two-way brake used in the embodiment shown in FIG. 8.

As illustrated in FIG. 9, the two-way clutch 71 has an inner race 72 and an outer race 73. The inner race 72 is attached onto the input shaft 14 such that it can rotate integrally with the input shaft 14. The outer race 73 is fixed to the internal circumference of the housing 31. An external circumferential surface 72a of the inner race 72 is a cam surface having a regular polygonal shape, and an internal circumferential surface 73a of the outer race 73 is a smooth cylindrical surface. Cam rollers 74 are arranged between the surfaces 72a and 73a. The number of cam rollers 74 is the same as the number of flat surfaces of the regular polygonal cam surface 72a of the inner race 72. The cam rollers 74 are held with a holder 75 so as to have equal spacing there-between in the circumferential direction, and the holder 75 elastically supported in the circumferential direction with an elastic ring 76 such that the cam rollers 74 are positioned in middle of the flat surfaces that make up the regular polygonal cam surface 72a of the inner race 72.

The two-way brake 71 is also provided with an electromagnet (not shown) that when energized acts to pull the holder 75 radially outward and restrict the position of the holder 75 with respect to the outer race 73. When the electromagnet is off, the holder 75 is not pulled radially outward toward the outer race 73 and, thus, the position of the holder 75 with respect to the outer race 73 is not restricted. Consequently, the holder 75 to is elastically supported in the circumferential direction by the elastic ring 76 such that the cam rollers 74 are positioned in middle of the flat surfaces that make up the regular polygonal cam surface 72a of the inner race 72. If the input shaft 14 receives a steering input and rotates, then the cam rollers 74 can roll while being held by the holder 75 so as to continue being positioned in the middle of the flat surfaces that make up the regular polygonal cam surface 72a of the inner race 72. As a result, the input shaft 14 can rotate freely in both directions with respect to the housing 31. In short, the two-way brake 71 is in a released state.

When the electromagnet is on, the holder 75 is pulled in a radially outward direction toward the outer race 73 and the position of the holder 75 is restricted with respect to the outer race 73. Consequently, positions of both the holder 75 and the cam rollers 74 are restricted with respect to the housing 31 in the circumferential direction. In this state, even if the input shaft 14 receives steering input and rotates, then the holding member 74 and the cam rollers 74 cannot rotate along with the input shaft 14. Instead, the inner race 72 rotates relative to the cam rollers 74 and the cam rollers 74 become pinched between corner portions of the regular polygonal cam surface 72a of the inner race 72 and the internal circumferential surface 73a of the outer race 73 such that the input shaft 14 is fixed and cannot rotate with respect to the housing 31 in either direction. In short, the two-way brake 71 is in an engaged state.

Figure 10:
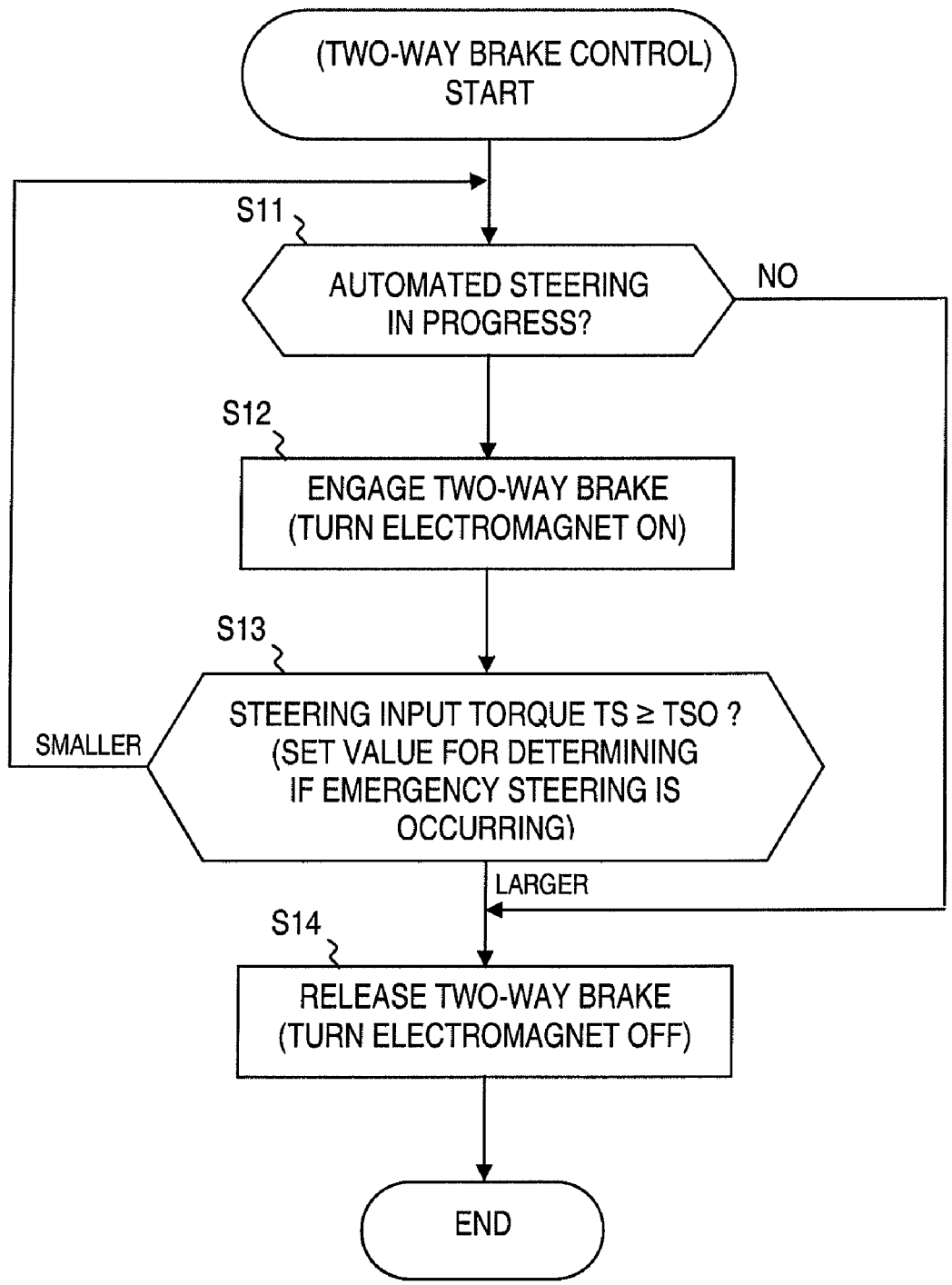
FIG. 10 is a flowchart showing a control program for controlling the engagement and release of the two-way brake used in the embodiment shown in FIGS. 8 and 9.

The control program shown in FIG. 10 serves to determine if the two-way brake 71 will be engaged or released by turning the electromagnet on or off. In step S11, the controller 21 checks if automated steering is required. Automated steering is required when the vehicle is driven automatically in order to, for example, parallel park or park in a garage. If automated steering is not required, then the variable gear ratio steering apparatus should be made to function in the same manner as described in the previous embodiments. Therefore, since it is not necessary for the input shaft 14 to be held fixed by the two-way brake 71, the controller 21 proceeds to step S14 and turns the electromagnet off such that the two-way brake 71 is released. As a result, the input shaft 14 can rotate freely with respect to the housing 31.

If the controller 21 determines in step S11 that automated steering will be executed, it proceeds to step S112 and turns on the electromagnet so as to engage the two-way brake 71. As a result, the input shaft 14 is held such that it cannot rotate in either direction with respect to the housing 31. Meanwhile, the two-way clutch 61 is released. In this state (i.e., with the two-way brake 71 engaged and the two-way clutch 61 released), a torque generated by driving the inner rotor 52 (i.e., the rotor of the gear ratio control motor 37) shown in FIG. 8 reaches the carrier 36. Meanwhile, the first ring gear 33 is stationary because the input shaft 14 is held by the two-way brake 71. Consequently, the rotation of the carrier 36 causes the pinions 35 to rotate and revolve along the inside of the first ring gear 33 such that the second ring gear 34 and the output shaft 15 are rotated. Automatic steering of the vehicle can be accomplished by driving the gear ratio control motor 37 (inner rotor 52) in the direction corresponding to the direction in which the wheels need to be turned.

During automatic steering, a steering assistance torque can be provided by the steering torque assistance motor 39 (outer rotor 53). The differential gear mechanism 32 functions to reduce the speed (amplify the torque) of the torque transferred from the gear ratio control motor 37 (inner rotor 52) to the ring gear 34 and the output shaft 15. As a result, a smaller, lower-torque motor can be used for the driving assistance motor 39. This embodiment is also very advantageous in terms of safety during automated steering because braking the input shaft 14 serves to hold the steering wheel 9 fixed.

During any period in which step S12 of FIG. 10 is executed such that the electromagnet is turned on and the two-way brake 71 is engaged for automated steering, the controller 21 also executes step S13 to determine if a steering input torque Ts from the steering wheel 9 is equal to or larger than a set value Tso for determining if a driver is attempting to perform emergency steering. In other words, in step S113, the controller 21 determines if the driver is attempting to operate the steering wheel 9 during automated steering (due to, for example, a feeling it is necessary to do so). If the steering input torque Ts is smaller than the set value Tso, then the controller 21 returns to step S11 and determines, again, if automated steering is in progress. If so, then the controller 21 proceeds to step S12 and engages the two-way brake 71 by turning the electromagnet on. If automated steering is not in progress, then the controller 21 proceeds to step S14 and releases the two-way brake 71 by turning the electromagnet off.

If it determines in step S113 that the steering torque Ts imparted from the steering wheel 9 is equal to or larger than the set value Tso (emergency steering determination value), i.e., if it determines that the driver is attempting to operate the steering wheel 9 during automated steering (due to, for example, a feeling it is necessary to do so), then the controller 21 releases the two-way brake 71 by turning the electromagnet off, thereby enabling the vehicle to be steered with the steering wheel 9 instead of being automatically steered.

Figure 11:
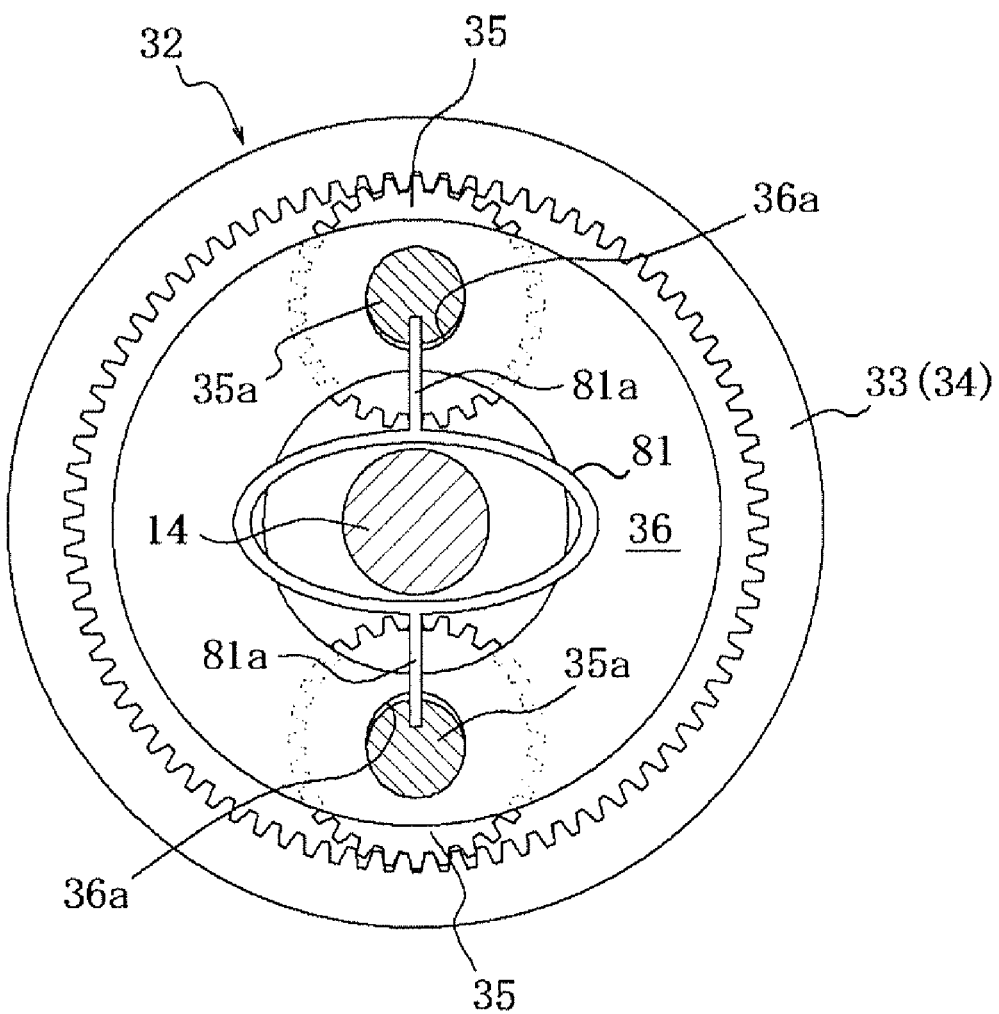
FIG. 11 is a front view, similar FIG. 3 that shows a differential gear mechanism in accordance with still another embodiment.

FIG. 11 shows an alternative structure for the differential gear mechanism 32. In this embodiment, the structure of the differential gear mechanism 32 differs from that of the previous embodiments with respect to the way the pinion shafts 35a (which rotatably support the pinions 35) are attached to the carrier 36. More specifically, the pinion shaft installation holes 36a formed in the carrier 36 for installing the pinion shafts 35a are configured to be elongated in a radial direction such that the pinion shafts 35 cannot be displaced in the circumferential direction but can be displaced in the radial direction.

An elastic ring 81 is arranged and configured to encircle the input shaft 14, and the elastic ring 81 is provided with push rods 81a that extend toward the pinion shafts 35a. The elastic ring 81 is circular when in a free-standing state. By squashing the elastic ring 81 in a radial direction as shown in the figure such that the reaction force of the elastic ring 81 generates a preload oriented toward the pinion shafts 35a, the push rods 81a can be arranged so as to push the pinion shafts 35a radially outward.

Thus, the elastic ring 81 preloads the push rods 81a so as to spring load the pinion shafts 35a in radially outward directions, thereby spring loading the rotatably supported pinions 35 in the same directions. As a result, the pinions 35 are pushed against the internal teeth of the first and second ring gears 33 and 34 at the portions were the pinions 35 mesh with the ring gears 33 and 34. This enables backlash to be eliminated at the portions where the pinions 35 mesh with the first and second ring gears 33 and 34 such that a good steering feel without play (slop) is obtained.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable gear ratio steering apparatus comprising:
a steering operating member;
a turning unit configured to turn a vehicle wheel; and
a gear ratio varying unit arranged between the steering operating member and the turning unit, the gear ratio varying unit comprising:
a differential gear mechanism including a first outside internally toothed gear that is coupled to the steering operating member, a second outside internally toothed gear that is coupled to an input shaft of the turning unit and arranged coaxially with respect to the first outside internally toothed gear, at least one common inside gear meshing with both the first outside internally toothed gear and the second outside internally toothed gear, and an inside gear support member rotatably supporting the inside gear, with the first outside internally toothed gear being disposed closer to the turning unit than the second outside internally toothed gear with respect to a direction along an input shaft of the gear ratio varying unit;
a gear ratio control motor operatively coupled to the inside gear support part; and
a steering torque assistance motor operatively coupled to the second outside internally toothed gear,
with the gear ratio control motor and the steering torque assistance motor being coaxially disposed about the input shaft of the gear ratio varying unit.

2. The variable gear ratio steering apparatus as recited in claim 1, wherein
the differential gear mechanism is a planetary type differential gear mechanism where the first outside internally toothed gear is a first ring gear, the second outside internally toothed gear is a second ring gear, the common inside gear is one of a plurality of common pinions, and the inside gear support member is a carrier.

3. The variable gear ratio steering apparatus as recited in claim 1, wherein
the steering torque assistance motor is coupled to the second outside internally toothed gear through a reduction gear arranged between the steering torque assistance motor and the second outside internally toothed gear.

4. The variable gear ratio steering apparatus as recited in claim 1, wherein
the first outside internally toothed gear has a tooth count that is larger than a tooth count of the second outside internally toothed gear by a number corresponding to a number of the common inside gears.

5. The variable gear ratio steering apparatus as recited in claim 1, further comprising
a two-way clutch arranged between the inside gear support member and the input shaft of the gear ratio varying unit to selectively couple the steering operating member and the inside gear support member together when the steering apparatus fails to function properly.

6. The variable gear ratio steering apparatus as recited in claim 5, wherein
the two-way clutch is an electromagnetic clutch that releases when electrically energized to disconnect the input shaft of the gear ratio varying unit from the inside gear support member such that the input shaft and the inside gear support member can rotate relative to each other in both directions, and that engages when not electrically energized to connect the input shaft of the gear ratio varying unit to the inside gear support member such that torque can be transmitted in both directions.

7. The variable gear ratio steering apparatus as recited in claim 1, further comprising
a two-way brake configured to hold the input shaft of the gear ratio varying unit stationary such that automatic steering can be accomplished with the gear ratio control motor.

8. The variable gear ratio steering apparatus as recited in claim 7, wherein
the two-way brake is an electromagnetic brake that engages when electrically energized to hold the input shaft of the gear ratio varying unit stationary, and that releases when not electrically energized to allow the input shaft of the gear ratio varying unit to rotate in both directions.

9. The variable gear ratio steering apparatus as recited in claim 7, wherein
the two-way brake is configured to release such that the input shaft of the gear ratio varying unit returns to a state in which the input shaft of the gear ratio varying unit can rotate in both directions when a steering input becomes equal to or higher than a prescribed value while the two-way brake is holding the input shaft of the gear ratio varying unit stationary.

10. The variable gear ratio steering apparatus as recited in claim 1, wherein
the common inside gear is rotatably supported on the inside gear support member for relative movement toward the internal teeth of the first and second outside internally toothed gears with a force applying member applying a force against the common inside gear to press the common inside gear against the internal teeth of the first and second outside internally toothed gears.

11. The variable gear ratio steering apparatus as recited in claim 1, wherein
the gear ratio control motor and the steering torque assistance motor are formed by a composite current multiple layer motor having a shared stator with inner and outer rotors that are arranged coaxially inside and outside of the stator, respectively, with the inner rotor being coupled to the inside gear support member such that the inner rotor and the stator constitute the gear ratio control motor and the outer rotor being coupled to the second outside internally toothed gear such that the outer rotor and the stator constitute the steering torque assistance motor.

12. The variable gear ratio steering apparatus as recited in claim 1, wherein
the input shaft of the gear ratio varying unit, the first outside internally toothed gear, the at least one common inside gear, the second outside internally toothed gear, the input shaft of the turning unit, and the turning unit are arranged with respect to each other such that a torque path is formed with torque being transmitted from the input shaft of the gear ratio varying unit through the first outside internally toothed gear, then through the at least one common inside gear, then through the second outside internally toothed gear, and then through the input shaft of the turning unit to the turning unit.

13. A variable gear ratio steering apparatus comprising:
a steering operating member;
a turning unit configured to turn a vehicle wheel; and
a gear ratio varying unit arranged between the steering operating member and the turning unit, the gear ratio varying unit comprising:
a differential gear mechanism including a first outside internally toothed gear that is coupled to the steering operating member, a second outside internally toothed gear that is coupled to an input shaft of the turning unit and arranged coaxially with respect to the first outside internally toothed gear, at least one common inside gear meshing with both the first outside internally toothed gear and the second outside internally toothed gear, and an inside gear support member rotatably supporting the inside gear by a hollow shaft that has an input shaft of the gear ratio varying unit passing therethrough, with the first outside internally toothed gear being disposed closer to the turning unit than the second outside internally toothed gear with respect to a direction along the input shaft of the gear ratio varying unit;
a gear ratio control motor operatively coupled to the inside gear support part by the hollow shaft; and
a steering torque assistance motor operatively coupled to the second outside internally toothed gear,
with the gear ratio control motor and the steering torque assistance motor being coaxially disposed about the input shaft of the gear ratio varying unit.

14. The variable gear ratio steering apparatus as recited in claim 13, wherein
the differential gear mechanism is a planetary type differential gear mechanism where the first outside internally toothed gear is a first ring gear, the second outside internally toothed gear is a second ring gear, the common inside gear is one of a plurality of common pinions, and the inside gear support member is a carrier.

15. The variable gear ratio steering apparatus as recited in claim 14, further comprising
a two-way brake configured to hold the input shaft of the gear ratio varying unit stationary such that automatic steering can be accomplished with the gear ratio control motor.

16. The variable gear ratio steering apparatus as recited in claim 15, wherein
the two-way brake is configured to release such that the input shaft of the gear ratio varying unit returns to a state in which the input shaft of the gear ratio varying unit can rotate in both directions when a steering input becomes equal to or higher than a prescribed value while the two-way brake is holding the input shaft of the gear ratio varying unit stationary.

17. The variable gear ratio steering apparatus as recited in claim 13, further comprising
a two-way clutch arranged between the inside gear support member and the input shaft of the gear ratio varying unit to selectively couple the steering operating member and the inside gear support member together when the steering apparatus fails to function properly.

18. The variable gear ratio steering apparatus as recited in claim 13, further comprising
a two-way brake configured to hold the input shaft of the gear ratio varying unit stationary such that automatic steering can be accomplished with the gear ratio control motor.

19. The variable gear ratio steering apparatus as recited in claim 18, wherein
the two-way brake is configured to release such that the input shaft of the gear ratio varying unit returns to a state in which the input shaft of the gear ratio varying unit can rotate in both directions when a steering input becomes equal to or higher than a prescribed value while the two-way brake is holding the input shaft of the gear ratio varying unit stationary.

20. The variable gear ratio steering apparatus as recited in claim 14, further comprising
a two-way clutch arranged between the inside gear support member and the input shaft of the gear ratio varying unit to selectively couple the steering operating member and the inside gear support member together when the steering apparatus fails to function properly.

* * * * *